United States Patent [19]

Lund

[11] Patent Number: 4,493,880

[45] Date of Patent: Jan. 15, 1985

[54] BATTERY SWITCH

[75] Inventor: Jeffrey S. Lund, Roseville, Minn.

[73] Assignee: Gould Inc., Rolling Meadows, Ill.

[21] Appl. No.: 562,953

[22] Filed: Dec. 19, 1983

[51] Int. Cl.³ .................................... H01M 2/20
[52] U.S. Cl. .................................. 429/97; 429/27; 429/122
[58] Field of Search ............... 429/97, 122, 123, 27, 429/72, 82

[56] References Cited

U.S. PATENT DOCUMENTS

| | | | |
|---|---|---|---|
| 2,468,430 | 4/1949 | Derksen | 429/27 |
| 3,897,268 | 7/1975 | Haraguchi | 429/97 |
| 4,177,327 | 12/1979 | Mathews et al. | 429/27 |
| 4,230,777 | 10/1980 | Gatto | 429/97 |
| 4,262,062 | 4/1981 | Zatsky | 429/27 |
| 4,371,593 | 2/1983 | Ramey | 429/97 |

*Primary Examiner*—Anthony Skapars

[57] ABSTRACT

A switch (11) for use in controlling operation of a metal-air battery (10). The switch includes a slide (21) guided for reciprocal movement in a preselected path adjacent a wall (18) defining a vent opening (19). The switch includes contacts (25,26,31,27,32,28) providing a closed electrical circuit as a result of the slide being disposed in a first position and providing an opened electrical circuit as a result of the slide being disposed in a second position. In the second position, the vent opening (19) is sealingly closed by a flexible closure strip (35) having one portion (37) adhesively bonded to the slide and a second portion (39) adhesively bonded to the wall portion (18) defining the vent opening. The strip is arranged to be selectively peeled from the slide bottom surface (38) and wall portion surface (40) and readhered to the opposite surface as a result of the selective movement of the slide in effecting the opening and closing of the vent opening.

9 Claims, 4 Drawing Figures

BATTERY SWITCH

DESCRIPTION

1. Technical Field

This invention relates to battery switches and in particular to switches for use with metal-air batteries.

2. Background Art

One form of conventional battery utilizes air-depolarizable cells within a housing provided with a vent opening. It is desirable to close the vent opening at all times other than when the battery is being used to supply electrical power, thereby substantially extending the useful life of the battery.

A number of different devices have been developed for selectively closing the vent opening of such metal-air batteries. One such structure is illustrated in U.S. Pat. No. 2,468,430, of Jan Cornelis Derksen. As shown therein, the switching means for connecting the battery cell in an electrical circuit is associated with an elastic strip which has an annular slit which opens when the switch knob is depressed.

John P. Mathews et al disclose, in U.S. Pat. No. 4,177,327, a metal-air battery having an electrically operated air access vent cover comprising a flexible element in the form of either a bimetal element or an elastic element. A vent cover actuator is operated to cause movement of the vent cover to a vent-opened position upon actuation of the battery. The actuator is electrically powered from the battery itself or from an auxiliary primary cell as desired.

In U.S. Pat. No. 4,262,062, Norman Zatsky discloses a metal-air battery having an internal gas permeable membrane for restricting the transfer of oxygen from the ambient atmosphere to the battery cathode. This structure utilizes an internal valve actuated by an external force on the cell to open the valve and admit substantial quantities of oxygen for intermittent high current drain on the cell. The external force is provided by the same switching device which closes the electric circuit requiring the high current drain.

DISCLOSURE OF INVENTION

The present invention comprehends an improved switch for use in controlling operation of a metal-air battery.

In the illustrated embodiment, the battery switch includes wall means defining a vent opening for admitting air to the battery cells in the housing, a slide, means for guiding the slide for movement in a preselected path adjacent the wall means, electrical switch means constructed to be closed as a result of the slide being disposed in a first position in the path and open as a result of the slide being disposed in a second position in the path, means for connecting the switch means to the battery cell terminals, a flexible closure, means for causing the closure to be sealed to the wall means across the vent opening for blocking air flow through the vent opening when the slide is in the second position, and causing the closure to be progressively peeled from the wall means for removing the closure from across the vent opening and thereby permitting air flow through the vent opening as a result of movement of the slide from the second position to the first position.

In the illustrative embodiment, the means for causing the closure to be sealed to the wall means comprises adhesive means.

In one form, the closure means comprises a flexible strip of synthetic resin, such as Mylar, having one portion secured to the slide and another portion secured to the wall means as by adhesive means.

The two portions of the flexible closure are facially abutted in the closed position of the switch.

In the illustrated embodiment, the slide path comprises a rectilinear path.

The switch means may be spring-biased for urging the slide toward the wall means in the closed condition of the switch.

The slide, in the illustrated embodiment, is provided with a finger manipulating portion for providing facilitated manual sliding of the valve between the open and closed positions of the switch.

BRIEF DESCRIPTION OF THE DRAWING

Other features and advantages of the invention will be apparent from the following description taken in connection with the accompanying drawing wherein.

BEST MODE FOR CARRYING OUT THE INVENTION

Figure 1:
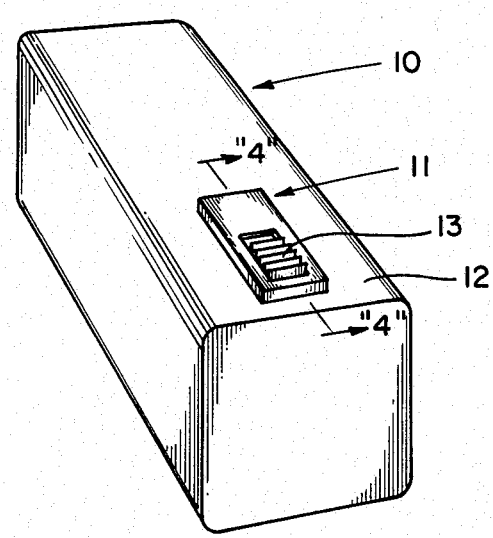
FIG. 1 is a perspective view of a battery having an improved switch embodying the invention.

In the illustrative embodiment of the invention as disclosed in the drawing, a metal-air battery generally designated 10 is provided with a switch generally designated 11 mounted to a housing 12 of the battery. The switch includes a finger manipulating portion 13 for selectively disposing the switch in electrically opened and closed switching conditions, while correspondingly selectively preventing and permitting air flow to the battery cells 14 within the housing 12.

Figure 2:
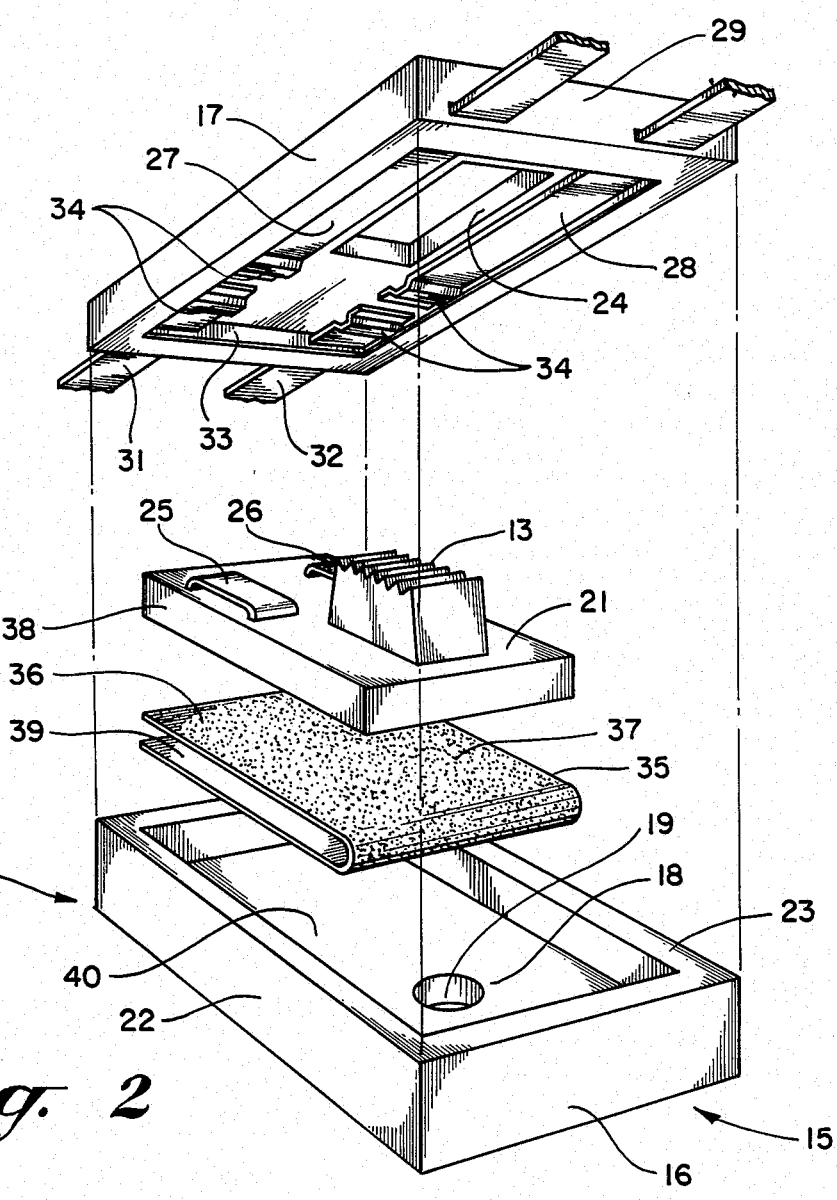
FIG. 2 is a fragmentary exploded isometric view illustrating the components of the switch in greater detail.
Figure 4:
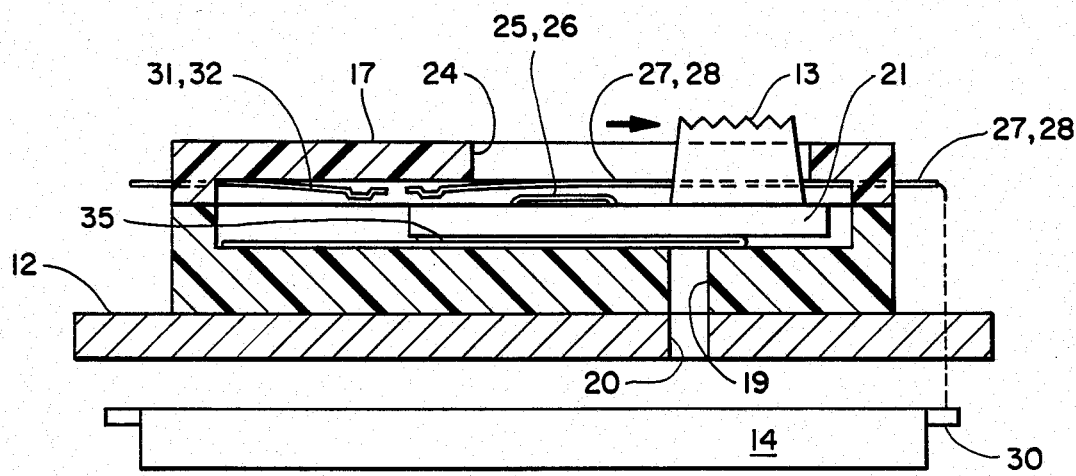
FIG. 4 is a view similar to that of FIG. 3 but with the switch components as arranged in the open condition of the switch, wherein the air vent opening is closed.

As best seen in FIG. 2, switch 11 includes a switch housing generally designated 15, including a base portion 16 and a cover portion 17. Base portion 16 is defined by a wall portion 18 defining a vent opening 19. As seen in FIG. 4, vent opening 19 may be aligned with an opening 20 in the battery housing 12 for selectively permitting air flow from the ambient atmosphere to the cells 14.

Switch 11 further includes a slide 21 which is reciprocable along a rectilinear path defined by sidewalls 22 and 23 of the base portion 16 of switch housing 15. Cover 17 is provided with a through opening 24 through which the finger manipulating thumbpiece 13 extends for engagement by the user's fingers.

On its upper surface, slide 21 is provided with a pair of movable contacts 25 and 26. The fixed contacts of the switch are defined by a first pair of spring finger contacts 27 and 28 extending through one end wall 29 of cover 17 for connection to cell terminals 30 of the battery.

The fixed contact means further includes a second pair of spring finger contacts 31 and 32 projecting outwardly through the opposite end wall 33 of the cover.

Figure 3:
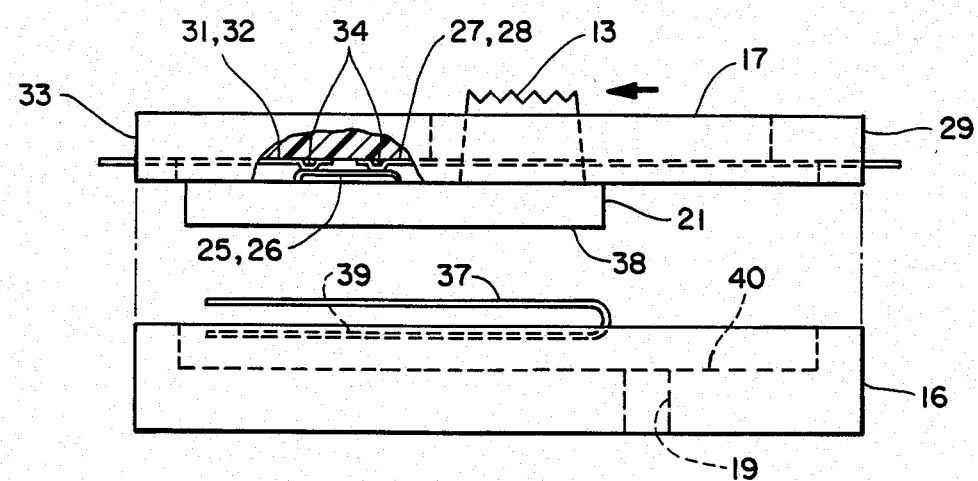
FIG. 3 is a fragmentary side elevation illustrating the arrangement of the switch components in the closed condition of the switch.

As seen in FIG. 2, the spring finger contacts are provided with distal formed portions 34 arranged so that the contact portions 34 of spring finger contacts 32 and 28 are bridged by movable contact 26 and formed portions 34 of spring finger contacts 31 and 27 are bridged by movable contact 25 when the switch is in the electrically closed condition, as shown in FIG. 3.

The invention comprehends the provision of a novel closure means for selectively closing the vent opening 19. As illustrated in FIG. 2, the closure generally designated 35 comprises a strip of flexible material, such as Mylar synthetic resin, having an adhesive coating 36 on one face thereof. As shown, the strip is folded to define a first portion 37 which is adhesively bonded to the undersurface 38 of slide 21, and a second portion 39 which is adhesively bonded to the upper surface 40 of wall portion 18.

Thus, when the switch is in the "off" condition, wherein the moving contacts 25 and 26 are spaced from the fixed contacts 31,27 and 32,28, the righthand end of strip portion 37 has been peeled from the slide undersurface 38 and underturned into adhesive engagement with the wall portion 18 defining the vent opening 19 so as to effectively sealingly close the vent opening.

As can be seen in FIG. 4, at this time, portions 37 and 39 of strip 35 are effectively facially abutted, being urged together by the slide 21 to effectively provide a positive closing of the vent opening 19.

When the manipulating portion 13 is urged to the left from the position of FIG. 4 to the position of FIG. 3, wherein the movable switch contacts 25,26 are in switch-closed relationship with the fixed contacts 31,32 and 27,28, the righthand end of strip portion 37 is peeled from the wall surface 40 of base 16 and adhesively secured to the undersurface 38 of slide 21 so as to expose vent opening 19 for providing communication between the ambient atmosphere and the interior of the battery housing 12.

As seen in FIG. 3, in the closed condition of the switch, the spring finger contacts urge slide 21 downwardly to maintain firm adhesive engagement between the slide and strip portion 37 and strip portion 39 and base surface 40.

INDUSTRIAL APPLICABILITY

The improved switch 11 may be utilized in a wide range of industrial applications in controlling the electrical connection and air vent means of metal-air batteries, such as zinc-air batteries and the like. The switch may be installed directly on the battery housing for use of the housing as a base for the switch.

Terminals 31 and 32 of the switch may be connected to the external appliance as desired.

The improved metal-air battery switch of the present invention is extremely simple and economical of construction while yet providing improved positive control of the air vent opening in a novel and simple manner.

The foregoing disclosure of specific embodiments is illustrative of the broad inventive concepts comprehended by the invention.

I claim:

1. A switch for use in controlling operation of a metal-air battery having air-depolarizable cells, means for housing the cells, and terminals connected to the cells, said switch comprising:
   wall means defining a vent opening for admitting air to the battery cells in the housing;
   a slide;
   means for guiding the slide for movement in a preselected path adjacent said wall means;
   electrical switch means constructed to be closed as a result of said slide being disposed in a first position in said path and open as a result of said slide being disposed in a second position in said path;
   means for connecting said switch means to the battery cell terminals;
   a flexible closure; and
   means for causing the closure to be sealed to said wall means across said vent opening when the slide is in said second position, and opening said vent opening and thereby permitting air flow through said vent opening as a result of movement of the slide from said second position to said first position.

2. The battery switch of claim 1 wherein said means for causing the closure to be sealed to said wall means comprises adhesive means.

3. The battery switch of claim 1 wherein said closure means comprises a flexible strip having one portion secured to said slide and another portion secured to said wall means.

4. The battery switch of claim 1 wherein said closure means comprises a flexible strip formed of a synthetic resin.

5. The battery switch of claim 1 wherein said closure means comprises a synthetic resin flexible strip having one portion adhesively secured to said slide and another portion adhesively secured to said wall means.

6. The battery switch of claim 1 wherein said closure means comprises a flexible strip having one portion secured to said slide and another portion secured to said wall means, said portions being facially abutted when said slide is in said first position.

7. The battery switch of claim 1 wherein said path comprises a rectilinear path.

8. The battery switch of claim 1 wherein said switch means comprises spring-biased means urging said slide toward said wall means.

9. The battery switch of claim 1 wherein said slide is provided with a finger manipulation portion for providing facilitated manual sliding of the slide in the guide between said first and second positions.

* * * * *